United States Patent
Chi et al.

(10) Patent No.: US 7,230,937 B2
(45) Date of Patent: Jun. 12, 2007

(54) METHOD FOR SUPPORTING TRAFFICS WITH DIFFERENT QUALITY OF SERVICE BY HIGH SPEED DOWN LINK PACKET ACCESS SYSTEM

(75) Inventors: Zhentao Chi, Shen Zhen (CN); Yufang Yi, Shen Zhen (CN)

(73) Assignee: Huawei Technologies Co., Ltd., Shen-Zhen (CN)

( * ) Notice: Subject to any disclaimer, the term of this patent is extended or adjusted under 35 U.S.C. 154(b) by 1056 days.

(21) Appl. No.: 10/310,282

(22) Filed: Dec. 5, 2002

(65) Prior Publication Data

US 2003/0203736 A1 Oct. 30, 2003

(30) Foreign Application Priority Data

Dec. 5, 2001 (CN) .............................. 01 1 30571

(51) Int. Cl.
*H04Q 7/00* (2006.01)
*H04J 3/16* (2006.01)

(52) U.S. Cl. .................... 370/329; 370/469; 370/412

(58) Field of Classification Search ............... 370/329, 370/469, 412
See application file for complete search history.

(56) References Cited

U.S. PATENT DOCUMENTS 6,374,112 B1* 4/2002 Widegren et al. ......... 455/452.2
6,477,670 B1* 11/2002 Ahmadvand ................ 714/712
6,606,311 B1* 8/2003 Wang et al. ................ 370/338
2002/0122432 A1* 9/2002 Chaskar ...................... 370/466

OTHER PUBLICATIONS

3GPP TR 25.855 v1.0.0, High Speed Downlink Packet Access; Overall UTRAN Description, Jun. 2001.*
3G TR 25.877 v0.1.0, High Speed Downlink Packet Access: Iub/Iur protocol Aspects, Oct. 2001.*

* cited by examiner

*Primary Examiner*—Chau Nguyen
*Assistant Examiner*—Kerri M Rose
(74) *Attorney, Agent, or Firm*—Dorsey & Whitney LLP

(57) ABSTRACT

A method for supporting the traffics with different Quality of Service by a High Speed Downlink Packet Access System is provided by incorporating the features of the High Speed Downlink Packet Access System (HSDPA) and by means of the implementation for supporting the traffics with different Qos by the third generation of mobile communication system REL99 system. The method for supporting provides mapping and configuring of the parameters of Qos in the system. Queues for storing the data of different transport channels are added in a Media Access Control layer of a Base Station in the High Speed Downlink Packet Access System (HSDPA). A queue scheduling method is designed to ensure the requirements of the traffics with different Qos.

9 Claims, 5 Drawing Sheets

METHOD FOR SUPPORTING TRAFFICS WITH DIFFERENT QUALITY OF SERVICE BY HIGH SPEED DOWN LINK PACKET ACCESS SYSTEM

CROSS-REFERENCE TO RELATED APPLICATION

This application claims priority to Chinese Patent Application No. CN 01130571.1, filed on Dec. 5, 2001, which is incorporated herein by reference.

FIELD OF THE INVENTION

The present invention relates to a method for a wireless communication system to support traffics with different Quality of Service ("Qos"), more particularly, relates to a method for a High Speed Down Link Packet Access system (HSDPA) to support traffics with different Qos.

BACKGROUND OF THE INVENTION

Supporting the traffics with different Qos by the third generation of mobile communication system REL99 system, relates to four aspects, they are: the system structure for supporting the traffics with different Qos by the REL99 system; mapping the attributes of Qos onto parameters that are operable by individual layers; signaling for transferring the associated parameters; and supporting methods, respectively.

As shown in FIG. 1, the third generation of mobile communication system broadband code division multiple access REL99 system includes a structure comprising a Radio Access Network side (UTRAN) and a Mobile Station side (UE). The structure of the Radio Access Network side (UTRAN) comprises four parts from an upper layer to a lower layer in sequence: a Core Network (CN) 11; a Service Radio Network Controller (SRNC) 12, which comprises a Radio Link Control Layer (RLC) A 121 and Media Access Control Private Channel Part (MAC-d) 122; a Control Radio Network Controller (CRNC) 13, which comprises Media Access Control common transport channel and shared channel part (MAC-c/sh) 131; and a Base Station (Node B) 14. The Core Network (CN) 11 is connected with the Service Radio Network Controller (SRNC) 12 via an Interface In; the Service Radio Network Controller (SRNC) 12 is connected with the Control Radio Network Controller (CRNC) 13 via an Interface Iur; the Control Radio Network Controller (CRNC) 13 is connected with the Base Station (Node B) 14 via an Interface Iub; and the Base Station (Node B) 14 is connected with different types of physical channels via Code Combination Transport channels (CCTrCHs).

A Radio Link Control Layer (RLC) A 121 is used for multiplexing the traffics with different Qos onto different logical channels, mapping the attributes of Qos of the traffics onto the configuration parameters of the Radio Link Control Layer (RLC) A 121, the priority of the logical channels, and the like.

If it is a private channel, then different logical channels are multiplexed on different transport channels by the Media Access Control Private Channel Port (MAC-d) 122 of the Service Radio Network Controller (SRNC) 12.

If they are the common channel and shared channel, then different logical channels are multiplexed on different transport channels by the Media Access Control common channel and shared channel port (MAC-c/sh) 131 of the Control Radio Network Controller (CRNC) 13.

The attributes of Qos of the traffics are mapped onto the Transport Format parameters (TFs) of the transport channels, the priority of the transport channels, and the like. A plurality of transport channels are multiplexed onto a Code Combination channel. Each Transmission Time Interval (TTI) may involve a plurality of transport channels that belong to the same Mobile Station. The Media Access Control private channel part (MAC-d) 122 and the Media Access Control common transport channel and shared channel part (MAC-c/sh) 131 are responsible for the data scheduling. The data of the transport channels that are multiplexed simultaneously on a transport channel of the Code Combination Transport channels (CCTrCHs) are scheduled by MAC-d 122 or MAC-c/sh 131 based on the associated Transport Format parameters (TFs) of the transport channels during a Transmission Time Interval (TTI), and the scheduled transport channel data are encoded and multiplexed to be a Code Combination Transport channel (CCTrCH) frame.

In the third generation of mobile communication system REL99 system, the Qos of the traffics comprises the following attributes:

1. Traffic class, comprising four classes: traditional traffics, data flow traffics, session traffics, and background traffics;
2. The maximum bit rate;
3. Guaranteed bit rate. The traffic typically requires a guaranteed bit rate;
4. Whether a Service Data Packet Unit (SDU) is transmitted in order or not;
5. The maximum capacity of the Service Data Packet Unit (SDU);
6. Format information of the Service Data Packet Unit (SDU), comprising a possible size of the Service Data Packet Unit (SDU);
7. The residual error ratio of the Service Data Packet Unit (SDU);
8. Whether an erroneous Service Data Packet Unit (SDU) is transmitted or not;
9. Processing priority, priority for processing a traffic frame;
10. Priority of resources allocation and release, that is, when the resources are lacking, the traffic will seize and maintain the priority of the resources.

A range is set for these attributes in a Radio Bearer Service part. These attributes are set by the Radio Access Network application part A (RNSAP) 22 of the Core Network (CN) 11 to obtain the attribute values of Qos of the traffics based on the contracts and characteristics of the traffics. The parameters of different configuration and operation of the resources are then obtained by each entity, interface, and layer based on the requirements of Qos, so that the attribute values of Qos of upper layers are mapped onto a set of parameters which are operable respectively by lower layers. The specific mapped layers and parameters are shown in Table 1:

TABLE 1

The Parameters Mapped onto the Radio Bearer Service Part for Attributes of Traffics with Different Qos in REL99

| Mapped parameters | Remarks |
| --- | --- |
| 1. Priority of logical channels | Qos mapped parameters of logical channel |

TABLE 1-continued

The Parameters Mapped onto the Radio Bearer Service Part for Attributes of Traffics with Different Qos in REL99

| Mapped parameters | | Remarks |
|---|---|---|
| 2. RLC (Radio Link Control) parameters | 1. RLC mode (acknowledgement, unacknowledgement, and transmittance) 2. Window size of RLC; 3. Setting of discarding RLC packet 4. Setting of RLC ACK and POLLING mechanism parameters | |
| 3. Priority of transport channels | | mapped Qos parameters of transport channels |
| 4. Number of transport channels | | |
| 5. Type of transport channels | | |
| 6. Priority of resources allocation and release | | |
| 7. TF (Transport Format) parameters | | |
| | Number of transport blocks Size of transport block Transmission Time Interval Type of channel encoding Coding rate Coding rate matching attribute Number of CRC check bits | |
| 8. Type of physical channels | | mapped Qos parameters of physical channels |
| 9. Number of channel codes | | |

RLC: Radio Link Control

The parameter map part is described in the above description.

The attribute values of Qos of traffics are mapped onto individual layer of the layers. Because each layer has different entities and interfaces, and the requirement of Qos of upper layer traffics is guaranteed commonly by the configuration of the resources controlled individually by each layer, so it is necessary to configure the interfaces and the corresponding layers of the entities based on Qos parameters, and to transfer the attributes of Qos that can not be mapped onto the current layer onto the entities and interfaces of lower layer after converting, and some associated signaling are required to accomplished these functions. The description of the associated mapped signaling of the attributes of Qos of the down link traffics on the Down link Shared Transport channels (DSCHs) will begin from the Core Network (CN) 11, setting and transferring of the main parameters can be seen clearly from the following signaling analysis.

1. As shown in FIG. 2, the entire signaling flow is as follows:

2. The Qos attributes, such as the traffic class, the maximum bit rate, and the guaranteed bit rate and the like, of different traffics are set by the Radio Access Network Application Part A (RANAP) 22 of the Core Network (CN) 11, and the set attribute values of Qos of the traffics are sent to the Radio Access Network Application Part B (RANAP) 23 of the Service Radio Network Controller (SRNC) 12 via a Radio Access Bearer Service Assignment Request (RAB Assignment Req). The parameters associated with Qos in the signaling are shown in Table 2:

TABLE 2

The Parameters Associating the Radio Access Bearer Assignment Request with the Attributes of Qos on Interface Iu in REL 99

| English Name of Information Domain | Remarks | Chinese Name of Information domain |
|---|---|---|
| Alternative RAB parameter values | | Alternative RAB parameter variables (可替换的 RAB 参数变量) |
| Alternative Maximum Bit Rate Information | This item is selectable. | Alternative Maximum Bit Rate Information (可替换的最大比特率信息) |
| Type of Alternative Maximum Bit Rate Information | Example of variables: 1. Uncertain; 2. Defining range; 3. Defining dispersion value. | Type of Alternative Maximum Bit Rate Information (可替换的最大比特率信息类型) |
| Alternative Maximum Bit Rate | 1. If it is defining range, defining upper limit; 2. If it is defining dispersion value, defining 16 dispersion values. | Alternative Maximum Bit Rate (可替换的最大比特率) |
| Alternative Maximum Bit Rate Information | This item is selectable. | Alternative Guaranteed Bit Rate (可替换的保证比特率) |
| Type of Alternative Maximum Bit Rate Information | Examples of variables: 1. Uncertain; 2. Defining range; 3. Defining dispersion value. | Type of Alternative Guaranteed Bit Rate Information (可替换的保证比特率信息类型) |
| Alternative Maximum Bit Rate | 1. If it is defining range, defining upper limit; 2. If it is defining dispersion value, defining 16 dispersion values. | Alternative Guaranteed Bit Rate (可替换的保证比特率) |
| RAB Parameters | | RAB Parameters (RAB 参数) |
| Traffic Class | Examples of variables: 1. Tradition traffic; 2. Flow traffic; 3. Session traffic; 4. Background traffic. | Traffic Class (业务类型) |
| RAB Asymmetry Indicator | Examples of variables: 1. Synchronized bi-direction; 2. Asynchrohized unidirectional down link; 3. Asynchrohized unidirectional up link; 4. Asynchronized bi-direction. | RAB Synchronism and Asynchronism Indicator (RAB 同步和异步指示) |
| Maximum Bit Rate | | Maximum Bit Rate (最大比特率) |
| Guaranteed Bit Rate | | Guaranteed Bit Rate (保证比特率) |
| Delivery Order | Examples of variables: 1. Transmitting in order; 2. Transmitting not in order. | Whether transmits indicator in order or not (是否按序发送指示最大) |
| Maximum SDU Size | | Maximum SDU Size (最大 SDU 大小) |
| SDU Parameters | Number of structure of the part equals to number of subflow. | SDU Parameters (SUD 参数) |

TABLE 2-continued

The Parameters Associating the Radio Access Bearer Assignment Request with the Attributes of Qos on Interface Iu in REL 99

| English Name of Information Domain | Remarks | Chinese Name of Information domain |
|---|---|---|
| SUD Error Ratio | | SUD Error Ratio (SDU 错误率) |
| Mantissa | | Mantissa (余数部分) |
| Exponent | | Exponent (指数部分) |
| Residual Bit Error Ratio | | Residual Bit Error Ratio (残余比特误码率) |
| Mantissa | | Mantissa (余数部分) |
| Exponent | | Exponent (指数部分) |
| Delivery Of Erroneous SDU | Examples of variables: 1. Transmitting; 2. Not transmitting; 3. Not detecting erroneous. | Whether transmits erroneous SDU or not (错误的 SDU 是否发送) |
| SDU Format Information Parameter | If defining the size of SDU for each data subflow, this item will be required to be set, Number of structure of the part equals to number of subflow. | SDU Format Information Parameter (SDU 格式信息参数) |
| Subflow SDU Size | | Subflow SDU Size (子数据流 SDU 大小) |
| RAB Subflow Combination Bit Rate | | RAB Subflow Combination Bit Rate (RAB 子数据流合并比特率) |
| Transfer Delay | This item is valid when tradition traffic and flow traffic | Transfer Delay (传输延迟) |
| Traffic Handling Priority | Valid when session traffic | Traffic Handling Priority (业务处理优先级) |
| Allocation/ Retention Priority | Priority corresponding to occupied resourcesof other radio access bearer. | Allocation/Retention Priority of Radio Access Bearer Service 无线接入承载服务 分配和保持的优先级别 |
| Priority Level | | Priority (优先级别) |
| Pre-emption Capability | Examples of types: 1. Not allowing for preempting other radio access bearer; 2. Allowing for preempting other radio access bearer. | Pre-emption Capability (抢占能力) |
| Pre-emption Vulnerability | Examples of types: 1. Allowing for being preempted by other radio access bearer; 2. Not allowing for being preempted by other radio access bearer. | Pre-emption Vulnerability (抢占弱点) |
| Queuing Allowed | Examples of types: 1. Allowing for queuing the request in the queue; 2. Not allowing for queuing the request in the queue. | Queuing Allowed (排队允许) |
| Source Statistic Descriptor | This item is valid when traditional session traffic, examples of types: 1. Speech; 2. Unknown. | Traffic Source Statistic Descriptor (业务源统计描述器) |
| Relocation Requirement | Valid when packet traffic, Examples of types: 1. No loss; 2. Real time. | Relocation Requirement (重定位要求) |

After the Radio Access Network Application Part B (RANAP) 23 of the Service Radio Network Controller (SRNC) 12 basing on and mapping the attributes of Qos of different traffics set by the Core Network (CN) 11 onto the parameters as shown in Table 1, the Service Radio Network Controller (SRNC) 12 performs setting of the Radio Link Control Layer (RLC) A 121 for logical channels that multiplexed the traffics based on the associate parameter part (mainly, the Radio link (RLC) parameter) of the logical channels. Since the setting of the part of parameters is at a semi static state, and it is changed only when the link is re-setup or reset, the guarantee of Qos of the traffics is also at a semi static state. Typically it is necessary to inform this parameter to the corresponding Radio Link Control layer of the Mobile Station. However, it is typically not necessary to transfer it to a lower layer entity at the Radio Access Network side.

It is known from Table 1 that the parameter part associated with the transport channels is mainly Transport Format (TF) parameters, and the parameters associated with each of the transport channels. A set of allowable Transport Formats, which are referred to as Transport Format Set, are configured by the Radio Resource Control A (RRC) 27 of the Service Radio Network Controller (SRNC) 12 based on the requirement of the attributes of Qos of the transport channel multiplex traffics. When the transport channel data are scheduled during a certain Transmission Time Interval (TTI), different transport channel data are formed into a Code Combination Transport channel (CCTrCH) frame by the Media Access Control common transport channel and shared channel part (MAC-c/sh) 131 based on the individual Transport Format (TF), and a selected Transport Format combination identifier is placed in the data frame for transferring together with the data. Mainly, a Radio Link Set up Request is used for transmitting the Transport Format parameter part to the Media Access Control common transport channel and shared channel part (MAC-c/sh) 131 of the Control Radio Network Controller (CRNC) 13 and the physical layer at the Base Station 14 side (NODE B). The parameters associated with Qos in the signaling is shown in Tables 3, 4, and 5:

TABLE 3

The Parameters Associating Qos with the Radio Link Request on Interface Iur in REL99

| English Name of Information Domain | Remarks | Chinese Name of Information Domain |
|---|---|---|
| DL DPCH Information | | Downlink Private Physical Channel Information (下行专用物理信道信息) |

TABLE 3-continued

The Parameters Associating Qos with the Radio Link Request on Interface Iur in REL99

| English Name of Information Domain | Remarks | Chinese Name of Information Domain |
|---|---|---|
| TFCS | Down link Transport Format combination set associated with a physical channel | |
| DSCH Information | How many DSCHs are setup, how many information structures are available. | Downlink Shared Channel Information (下行共享信道的信息) |
| DSCH ID | | Dowlink Shared Channel Identifier (下行共享信道的标识) |
| TrCh Source Statistics Descriptor | Examples: 1. RRC signaling; 2. Speech. | Transport channel Source Statistics Descriptor (传输信道源统计描述) |
| Transport Format Set | Transport Format Set associated with a transport channel | Transport Format Set (传输格式集) |
| Allocation/Retention Priority | With the same meaning as RAB Assignment Req on Interface Iu | Allocation/Retention Priority of Resources (资源分配和保持优先级别) |
| Scheduling Priority Indicator | Relative Priority between a plurality of DSCH channels | Scheduling Priority Indicator (调度优先级别指示) |
| BLER | | Block Error Rate (块错误率) |

TABLE 4

The Parameters Associating Qos with the Radio Link Request on Interface Iub in REL99

| English Name of Information Domain | Remarks | Chinese Name of Information Domain |
|---|---|---|
| DL DPCH Information | | Downlink Private Physical Channel Information (下行专用物理信道信息) |
| TFCS | Down link Transport Format combination set associated with a physical channel | |
| DSCH Information | How many DSCHs are setup, how many information structures are available. | Downlink Shared Channel Information (下行共享信道的信息) |
| DSCH ID | | Downlink Shared Channel Identifier (下行共享信道的标识) |
| TrCh source Statistics Descriptor | Examples: 1. RRC signaling; 2. Speech. | Transport channel Source Statistics Descriptor (传输信道源统计描述) |
| Transport Format Set | Transport Format Set associated with a transport channel | Transport Format Set (传输格式集) |
| Allocation/Retention Priority | With the same Meaning as RAB Assignment Req on Interface Iu | Allocation/Retention Priority of Resources (资源分配和保持优先级别) |
| Scheduling Priority Indicator | Relative Priority between a plurality of DSCH channels | Scheduling Priority Indicator (调度优先级别指示) |

TABLE 4-continued

The Parameters Associating Qos with the Radio Link Request on Interface Iub in REL99

| English Name of Information Domain | Remarks | Chinese Name of Information Domain |
|---|---|---|
| ToAWS | | Window Start Point Expected by the Downlink Data to Receive (下行数据期望接收的窗口开始点) |
| ToAWS | | Window End Point Expected by the Downlink Data to Receive (下行数据期望接收的窗口结束点) |

The information domains involved in both Transport Format Sets are completely the same, as shown in Table 5.

TABLE 5

The Information Domains of Transport Format Sets Associating with DSCHs in REL99

| English Name of Information Domain | Remarks | Chinese Name of Information Domain |
|---|---|---|
| Transport Format Set Dynamic Transport Format Information | How many transport channels are available, how many domains of Transport Formats are available. | Dynamic Part of Transport Format Information (传输格式动态部分) |
| Number of Transport blocks | | Number of Transport blocks (传输块的数目) |
| Transport Block Size | | Size of Transport blocks (传输块的大小) |
| Semi-static Transport Format Information | only one domain is available for each transport channel | Semi-static Part of Transport Format Information (传输格式信息的半静态部分) |
| Transmission Time Interval | 1. Several modes such as 10 ms, 20 ms, 40 ms, and 80 ms are available in static state 2. Dynamic state | Transmission Time Interval (传输时间间隔) |
| type of Channel Coding | Examples of Types: 1. No code; 2. Convolution code; 3. TUEBO code | type of Channel Coding (信道编码类型) |
| Coding Rate | Examples: 1. 1/2; 2. 1/3; | Coding Rate (码率) |
| Rate Matching Attribute | | Coding Rate Matching Attribute (码率匹配属性) |
| CRC size | Examples: 1. 0; 2. 8; 3. 12; 4. 16; 5. 24 | CRC size (CRC 校验位数) |

The Radio Access Network side (UTRAN) and the Mobile Station side (UE) are correspondent on the protocol layer. Therefore, the configuration of the associated parameters of the logical channels (mainly, RLC parameters) and the transport channels (mainly, Transport Format parameters) are informed by the network to the Mobile Station 21 via the Radio Bearer Setup signaling. Based on these parameters, Mobile Station 21 sets each corresponding entity in order to cooperate with the attributes of Qos of the guaranteed traffics. The parameters in the signaling associated with Qos of the traffics are shown in Table 6:

TABLE 6

The Parameters associated with Qos in REL99 During Setting up Radio Bearer Services

| English Name of Information Domain | Remarks | Chinese Name of Information Domain |
|---|---|---|
| RB Information Elements | | Radio Bearer Information Domain (无线载体信息域) |
| Signaling RB information to setup | How many RBs are setup, how many information structures are available | Signaling setup by RB Information (RB 建立的信令) |
| RLC info | | Associated Information set by RLC (RLC 设置的相关信息) |
| RLC mode | Examples of Types: 1. Acknowledgement; 2. Unacknowledgement; 3. Transmittance | RLC mode (RLC 的模式) |
| AM | If it is acknowledgement mode, the following domains will be setup. | Acknowledgement Mode (传输 RLC 的丢弃) |
| Transmission RLC discard | Mainly, selecting different processing modes for RLC PDU discarding 1. Explicit signaling available based on timer 2. No explicit signaling available based on timer 3. Maximum retransfer times; 4. Not discarding; and setting parameters, such as length of timer, maximum retransfer times, and etc., for respective processing mode. | Transmission RLC discard (信道编码类型 RLC 码率) |
| Timer_RST | 50, 100, 150, 200, 250, 300, 350, 400, 450, 500, 550, 600, 700, 800, 900, 1000 | Detecting Timer Length Lost by Reset Ack PDU (检测重新设置确认数据包丢失的定时器长度) |
| Max_RST | 1, 4, 6, 8, 12, 16, 24, 32 | Times of Re-transferring Reset Packet (重传重新设置数据包的次数) |
| Polling Information | Setting associated Parameters of Polling mechanism | Polling Information Setting (Polling 信息设置) |
| In-sequence delivery | | Whether delivery in sequence or not (是否按序号发送) |
| Receiving window size | | Receiving window size (接收窗的大小) |
| Downlink RLC status Info | | Set status of RLC PDU Information (设置 RLC 的状态 PDU 信息) |
| UM RLC | If it is acknowledgement mode, the following domains will be setup. | Unacknowledgement Mode (非确认模式) |
| Transmission | Mainly, selecting different | Transmission RLC discard |

TABLE 6-continued

The Parameters associated with Qos in REL99 During Setting up Radio Bearer Services

| English Name of Information Domain | Remarks | Chinese Name of Information Domain |
|---|---|---|
| RLC discard | processing modes for RLC PDU discarding 1. Explicit signaling available based on timer 2. No explicit signaling available based on timer 3. Maximum retransfer times; 4. Not discarding; and setting Parameters, such as length of timer, maximum retransfer times, and etc., of respective processing mode. | (传输 RLC 的丢弃) |
| TM Mode Transmission RLC discard | Mainly, selecting different modes for RLC PDU discarding 1. Explicit signaling available based on timer 2. No explicit signaling available based on timer 3. Maximum retransfer times; 4. Not discarding; and setting Parameters, such as length of timer, maximum retransfer times, and etc., for respective processing mode. | Transmission RLC discard (传输 RLC 的丢弃) |
| Segmentation indication | Boolean variable yes or no | Indicating dividing into Segments or not (指示是否分段) |
| RB Map Information | How many RBs setup, how many information structures are required. | Mapped Information of Radio Bearer (无线载体的映射信息) |
| Downlink RLC Logical Channel Info | | Downlink Logical Channel Information (下行逻辑信道信息) |
| Number of downlink RLC logical channels | | Number of downlink logical channels (下行逻辑信道数目) |
| Downlink transport channel type | DCH, FACH/PCH, DSCH, DCH + DSCH | Type of Downlink transport channel (下行传输信道类型) |
| MAC logical channel priority | | Priority for multiplexing Logical Channel at MAC layer (逻辑信道在 MAC 层的复用优先级别) |
| RAB information for setup | How many RABs setup, how many information structures are available. | Information Domain Setup by RAB (RAB 建立的信息域) |
| RB Information for Setup | The information domain includes Qos signaling parameters and completely the same as the front part in the Table. | Information Setup by RAB (RAB 建立的信息) |
| RB Map Information | How many RBs setup, how many information structures are required; Mapped information of Radio Bearer | Mapped Information of Radio Bearer (无线载体的映射信息) |
| Dplink transport channels | | |
| DI Transport channel | | Common Information of Downlink Transport |

TABLE 6-continued

The Parameters associated with Qos in REL99 During Setting up Radio Bearer Services

| English Name of Information Domain | Remarks | Chinese Name of Information Domain |
|---|---|---|
| common information | | Channel (添加和配置信息) |
| TFS | Information domain as shown in FIG. 5 | Transport Format Set (传输格式集) |
| Added or Reset DL TrCH | | Added or Reset DL TrCH Information (下行传输信道 添加和配置信息) |
| information TFS | Information domain as shown in FIG. 5 | Transport Format Set (传输格式集) |

The signaling, such as reset, add and deletion signaling and etc., is associated with the signaling of the Radio Link Setup Request, the function for transferring the mapped parameters of Qos by these signaling is the same, and the associated parameters are substantially the same.

The method for supporting different traffics of Qos in REL99 comprises the following steps:

1. The attributes of Qos, which have been set by the Core Network (CN) 11 in the Radio Access Bearer Service Assignment Request (RAB Assignment Req) based on the service contracts and the characteristics, are received by the Service Radio Network Controller (SRNC) 12 (as shown in FIG. 2), and are mapped onto the parameters as shown in Table 1.

2. The Radio Link Control Layer (RLC) 121 for traffic multiplex logical channels is set by the Service Radio Network Controller (SRNC) 12 based on a parameter part (mainly, the Radio Link (RLC) parameters) associated with the logical channels. The setting of the parameter part is at a semi static state, so that it is changed only when resetting up or implementing the links, therefore, the guarantee to Qos of the traffics by which is also at a semi static state. The Radio Link layer (RLC) 121 is configured by the corresponding Radio Link Control Layer (RLC) 121 at the Mobile Station side based on the parameters part transferred by the Service Radio Network Controller (SRNC) 12 via the Radio Bearer Setup signaling (Radio Link Control part is not shown in Table 6).

3. The parameters (TF) part associated with the transport channels mapped by the Service Radio Network Controller (SRNC) 12 in Table 1 is a set of allowed Transport Formats associated with each of the transport channels. These parameters (Table 3) are transferred to the Control Radio Network Controller (CRNC) 13 via the Radio Link Setup Request signaling of the Interface Iur. When the transport channels are being scheduled by the Media Access Control common transport channel and shared channel part (MAC-c/sh) 131, the channel data are transmitted based on the Transmission Time Interval (TTI) to select suitable Transport Format for each transport channel from its Transport Format Set. The format indicators are transmitted together with the data to the physical layer. The selection of the Transport Format determines the attributes, such as the Transmission Time Interval (TTI), the rate of the transport channel, and the error coding rate, and the like. Therefore, the guarantee to Qos of the traffics provided by the part is at a dynamic state.

4. On the physical layer, there are Transport Format parameters configured on each transport channel and transferred by the Radio Link Setup Request via Interface Iub (Table 4). Based on the parameters, all of the transport channel data multiplexed on the Code Combination Transport channels (CCTrCHs) are encoded and code-division multiplexed into a data frame to be transferred to the Mobile Station (UE) 21, and the Transport Format combination parameters selected for transferring the data form the indicators to be informed to the Mobile Station (UE) 21. Because the Transport Formats and their combination parameters of each transport channel has been transferred to the Mobile Station (UE) 21 via Radio Bearer Setup Radio network side, it is indicated that the Transport Format combinations of the transmission data of current Transmission Time Interval (TTI) for decoding and distributing the data are obtained.

It can be seen from above, the most important thing for the guarantee of Qos of the traffics is the Radio Link Control parameter part of the semi static state and the Transport Format part of the dynamic state. The Transport Format part affects directly the scheduling of the transport channel data within each Transmission Time Interval (TTI).

The differences between both HSDPA and REL99 systems will be compared as follows:

In the High Speed Downlink Packet Access System (HSDPA), the functions of scheduling the shared channel data by the Media Access Control layer (MAC-c/sh) 131 of the Control Radio Network Controller (CRNC) 13 in REL99 is accomplished by a new added High Speed Media Access Control layer (MAC-hs) at the Base Station side (Node B). The different transport channels in REL99 can be code multiplexed within the same Transmission Time Interval (TTI), while only one transport channel is included in one Transmission Time Interval in the High Speed Downlink Packet Access System (HSDPA). This will cause the following problems:

A very important part for supporting different traffic methods in REL99 is the selection of Transport Format parameters when scheduling the transport channel data, balance adjustments are made on the transport channels that are multiplexed simultaneously within the same Transmission Time Interval (TTI), so that the traffics multiplexed on the transport channels reach the requirement of a preset Qos. Because the transport channels that are multiplexed simultaneously within the same Transmission Time Interval (TTI) are not present in the High Speed Downlink Packet Access System, it is necessary to consider new methods for scheduling the data.

By analyzing the substantial variables of the Transport Formats associated with the transport channels in REL99, it is found that the guarantee of Qos of the traffics is the configuration and behavior controlled and set directly by the upper layer based on the requirements of the attributes of Qos of the traffics, for example, the size of the transport block, the number of the transport blocks that are affecting the encoding mode of dividing and scheduling of the data, and the coding rate and rate matching parameters that are affecting directly the encoding behavior of the physical layer. However, they are not suitable in High Speed Downlink Packet Access System. The reasons are:

1. An Adaptive Modulation and Coding (AMC) function is implemented at the Base Station side (Node B), the main function of which is to select automatically the modulation and coding method of the current data based on the channel conditions within the Transmission Time Interval (TTI), so that the modulation mode, the coding mode, the coding rate, and the rate matching are not selected by an upper layer any longer;

2. In order to cause the coding of the physical layer to have a high efficiency, the size of the transport block is fixed, so that the size of the transport block is also not determined by the upper layer;

3. The size of the transport block is fixed, the size of the transport block may be calculated based on the modulation and coding mode and the number of physical channels, so that the upper layer has no way of selecting the number of transport blocks;

4. The Transmission Time Interval is fixed to 3 slots=2 ms, so that the upper layer has no way of selection.

5. The number of the physical channels are configured semi statically by the upper layer in REL99, and it is changed only when resetting up and implementing the transport channels. However, it is changed when scheduling the data within each Transmission Time Interval (TTI) in the High Speed Downlink Packet Access System (HSDPA), so that the determination by the upper layer is meaningless.

Thus, it can be seen that the behaviors of controlling and configuring directly the lower layer by using Transport Format parameters as used in REL99 can not be used in High Speed Downlink Packet Access System (HSDPA). It is required to supply the parameters of the attributes of Qos that can be characterized by the lower layer. Corresponding structures and methods are required to ensure the implementation of the characteristic of these parameters.

SUMMARY OF THE INVENTION

The object of the invention is to provide a method to support the traffics with different Qos in High Speed Downlink Packet Access System (HSDPA).

The invention is implemented in such a way:

Step a, when the traffics with several different attribute requirements of Qos require to be serviced at the Core Network (CN) side of the High Speed Downlink Packet Access System, the attributes of Qos are set by the Core Network (CN) based on the contracts and characteristics of several services, and the set attribute values of Qos are transferred to the Radio Access Network Application Part B (RNSAP) of the Service Radio Network Controller (SRNC) via a Radio Access Bearer Service Assignment Request;

Step b, the attributes of Qos of the traffics are mapped onto the parameters that are operable by the Radio Link Control layer, the High Speed Media Access Control layer, and the physical layer by the Service Radio Network Controller (SRNC) 12, the parameters that are operable by the Radio Link Control layer are the mapped parameters of Qos of the logical channels, the parameters that are operable by the High Speed Media Access Control layer are the mapped parameters of Qos of the transport channels, and the parameters that are operable by the physical layer are the mapped parameters of Qos of the physical channels.

Step c, the parameters of the logical channel part that can be set in its own layer are set by Radio Link Control layer of the Service Radio Network Controller (SRNC), and the setting up of the channels and the setting of the associated parameters are informed to the Mobile Station via the Radio Bearer Service Setup signaling;

Step d, the parameters of the transport channel part and the physical channel parameters that can not be set by the Radio Link Control layer are transferred by the Service Radio Network Controller (SRNC) to the High Speed Media Access Control layer and the physical layer at the Base Station side via the Radio Link Setup Request signaling, allowing the High Speed Media Access Control layer and the physical layer to set the parameters that can be set in their own layers;

Step e, the data queues corresponding to the different transport channels on the Interface Iub/Iur for storing different attributes of Qos for the different Mobile Stations are setup by the High Speed Media Access Control layer at the Base Station side based on the received parameters of the transport channel part, the attribute requirements of the transport channels are thus the attribute requirements of the queues;

Step f, a controlled parameter table of the queue operation in the scheduling method is set by the High Speed Media Access Control layer at the Base Station side based on the queue attributes. The queue scheduling method performs the data scheduling based on the controlled parameter table to ensure the attribute requirements of Qos of the transport channels.

In the supporting methods, the traffics with different Qos are mapped onto the different logical channels by the Radio Link Control layer of the Service Radio Network Controller (SRNC) in the High Speed Downlink Packet Access System; the different logical channels are mapped by the Media Access Control layer of the Control Radio Network Controller (CRNC) onto the different transport channels, then the traffic data are transmitted through the physical channel.

The mapped parameters of Qos of the logical channels comprises the Priority of the logical channel and the parameters of the Radio Link Control layer, the parameters of the Radio Link Control layer comprises Radio Link Control layer mode, the Radio Link Control layer mode is divided into an acknowledgement mode and an unacknowledgement mode; window size of the Radio Link Control layer; a mechanism for discarding the packets of the Radio Link Control layer; size of RLC PDU; and the mechanism parameters of PLC ACK and POLLING;

The mapped parameters of Qos of the transport channels comprise the Priority of the transport channels, the number of transport channels, and the transport channel attributes; the transport channel attributes comprise the maximum bit rate of the transport channel attributes, a residual bit error code ratio of the transport channel data, a guaranteed bit rate of the transport channel data, and a delay requirement of the transport channel data;

The mapped parameters of Qos of the physical channels comprise the type of the physical channel and the number of the channel codes, the type of the physical channel is fixed as a High Speed Downlink shared channel for the high speed data traffics; an initial value can be set as the number of the channel codes, however, the scheduling of the Media Access Control layer will be changed at each transmission time.

In step d, the Transport Format Set of the transport channel parameters transferred by the request signaling, which is setup by the Radio Link of the Service Radio Network Controller (SRNC), is substituted by the transport channel attributes, the transport channel attributes comprise the maximum bit rate of the transport channel attributes, a residual bit error code ratio of the transport channel data, a guaranteed bit rate of the transport channel data, and a delay requirement of the transport channel data; the settings of the other parameters are the same as that in the method for supporting the traffics with different Qos by the third generation of the mobile communication system broadband code division multiple access REL99 system.

In step c, the Transport Format Sets of the parameters, which are associated with Qos and transferred by the Radio Bearer Service Request signaling, are deleted completely, the settings of the other parameters of Qos are the same as that in the method for supporting the traffics with different Qos by REL99 system.

In step d, the queue attributes are:

The maximum bit rate of the transport channel data<a1n;

The residual bit error code ratio of the transport channel data<a2n;

The guaranteed bit rate of the transport channel data<a3n;

The delay requirement of the transport channel data<a4n;

Then, the following controlled parameters can be set and the value assignment can be performed:

The maximum re-transferring times of the data blocks=b1n;

The possible delay of the re-transferred data (number of TTI)=b2n;

The valid life time period of the data in the queue=b3n;

The Priority of scheduling the queuing data=b4n;

The number of the physical code channels=b5n;

wherein, n=0, 1, 2 . . . of positive integer number.

As shown in FIG. 5, the method for scheduling the data by the queue scheduling method based on the set controlled parameters described in step f comprises the following steps:

Step aa, after the data queues being setup and the queue attributes being set by the High Speed Media Access Control layer, the data scheduling will begin;

Step bb, the data queues of the traffics with different Qos of the different Mobile Stations are scanned by the High Speed Media Access Control layer from the high Priority of the queues;

Step cc, whether there are data in the queues or not are determined. If there are, then it will proceed to step dd; if there are not, then the next data queue will be scanned by the High Speed Media Access Control layer, and returns to step bb;

Step dd, whether the valid life time period of the data in the queue is 0 or not is determined by the High Speed Media Access Control layer. If it is 0, then it will proceed to step hh; if it is not 0, then it will proceed to step ff;

Step ee, whether the queue has been scanned completely or not is determined by the High Speed Media Access Control layer. If the queue has not been scanned completely, then it will return to step bb; if it has been scanned completely, then it will proceed to step ee;

Step ff, the re-transferred data are scanned by the High Speed Media Access Control layer to determined whether there is re-transferred data with a delay of 0 or not, or whether the number of the Transmission Time Interval is 0 or not. If it is 0, it will proceed to step hh; if it is not 0, it will proceed to step gg;

Step gg, whether the selected modulation and coding method is the same as that of the re-transferred data or not is determined by the High Speed Media Access Control layer. If they are the same, it will proceed to step hh. If they are different, then the data will be retrieved by the High Speed Media Access Control layer from the queue with the highest scheduling level, and it will proceed to step kk;

Step hh, the re-transferred data are scheduled and transmitted by the High Speed Media Access Control layer, and proceeds to step ll;

Step ii, whether there are re-transferred data that reach the maximum delay or not is determined by the High Speed Media Access Control layer. If there are re-transferred data that reach the maximum delay, then the re-transferred data will be discarded first, then it will return to step jj; if there are no re-transferred data that reach the maximum delay, then it will proceed directly to step jj;

Step jj, the data with a valid life time period of 0 in the queues are retrieved by the High Speed Media Access Control layer;

Step kk, a suitable number of the physical code channels is selected by the High Speed Media Access Control layer based on the number of the data blocks and the selected modulation and encoding method for scheduling and transmitting the data;

Step ll, the controlled data of the queuing data are updated by the High Speed Media Access Control layer, and returns to step aa.

In order to increase the efficiency of re-transferred data in the High Speed Downlink Packet Access System (HSDPA), a mixed automatic re-transferring function (HARQ) is implemented in the physical layer for re-transferring the encoded data that have not been decoded and received correctly by the Mobile Station (UE). The mixed automatic re-transferring function is still controlled by the High Speed Media Access Control layer (MAC-hs), that is, to control the moment of re-transferring and the times of re-transferring.

A Down link Shared Transport channel (HS-DSCH) with only one empty port exists between each Mobile Station (UE) and Base Station, a plurality of transport channels can be setup by Interface Iur/Iub.

Only the data of one queue can be transferred during one Transmission Time Interval.

The significant result of the invention is to provide a method for supporting the traffics with different Qos by a High Speed Downlink Packet Access System. By employing the characteristic parameters of Qos of the traffics suggested by the invention and by increasing the corresponding data queues and the method of the queue scheduling, the supporting method can be implemented.

DETAILED DESCRIPTION OF THE PREFERRED EMBODIMENTS

The invention will be described in further detail by the following embodiments and the accompanying drawings.

It is assumed that traffics with the attribute requirements of three kinds of different Qos require services at Core Network (CN) 11 side of a High Speed Downlink Packet Access System.

Figure 1:
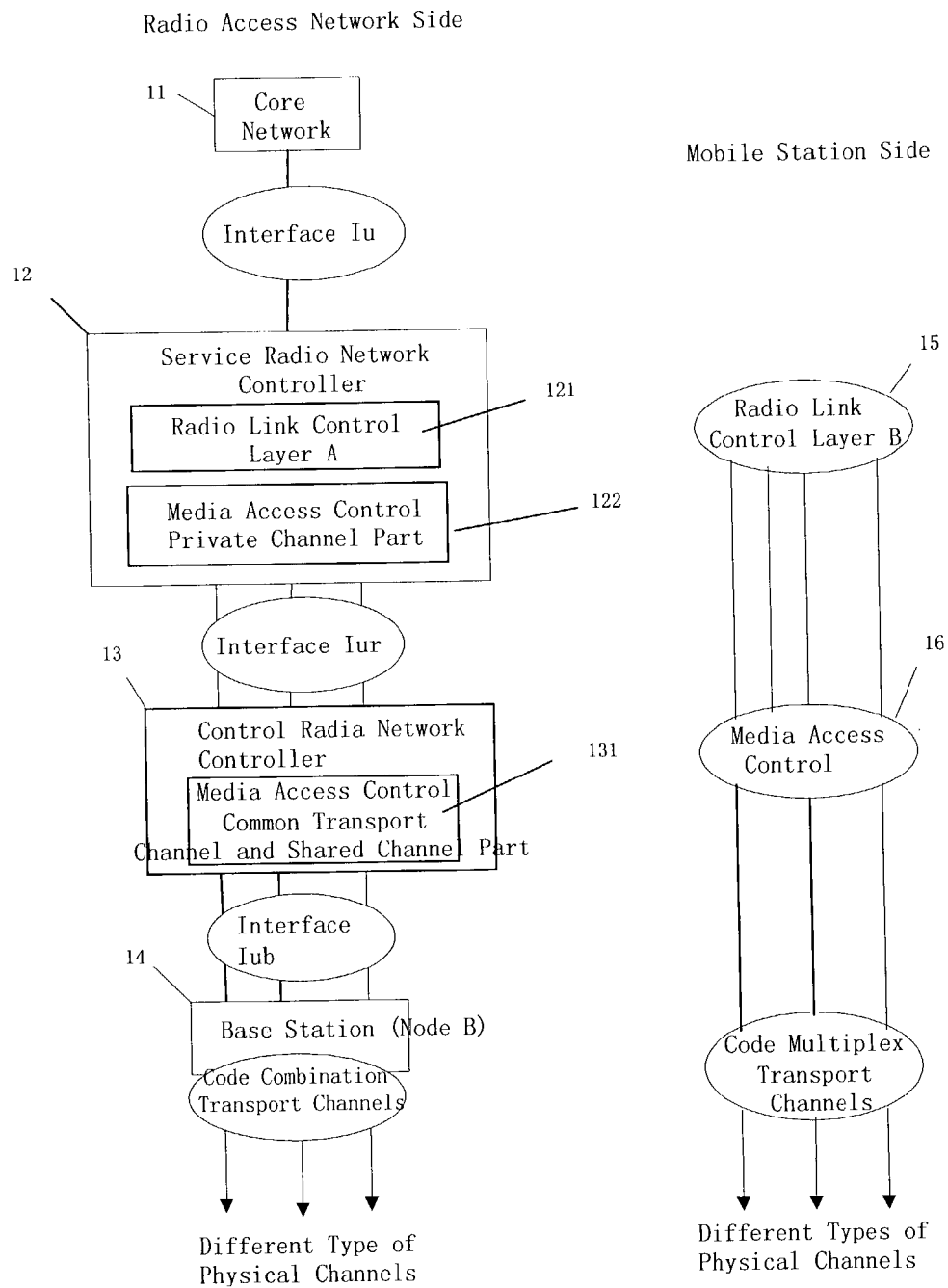
FIG. 1 is a structure of UTRAN side and UE side in a REL99 system that supports the traffics with different Qos.
Figure 2:
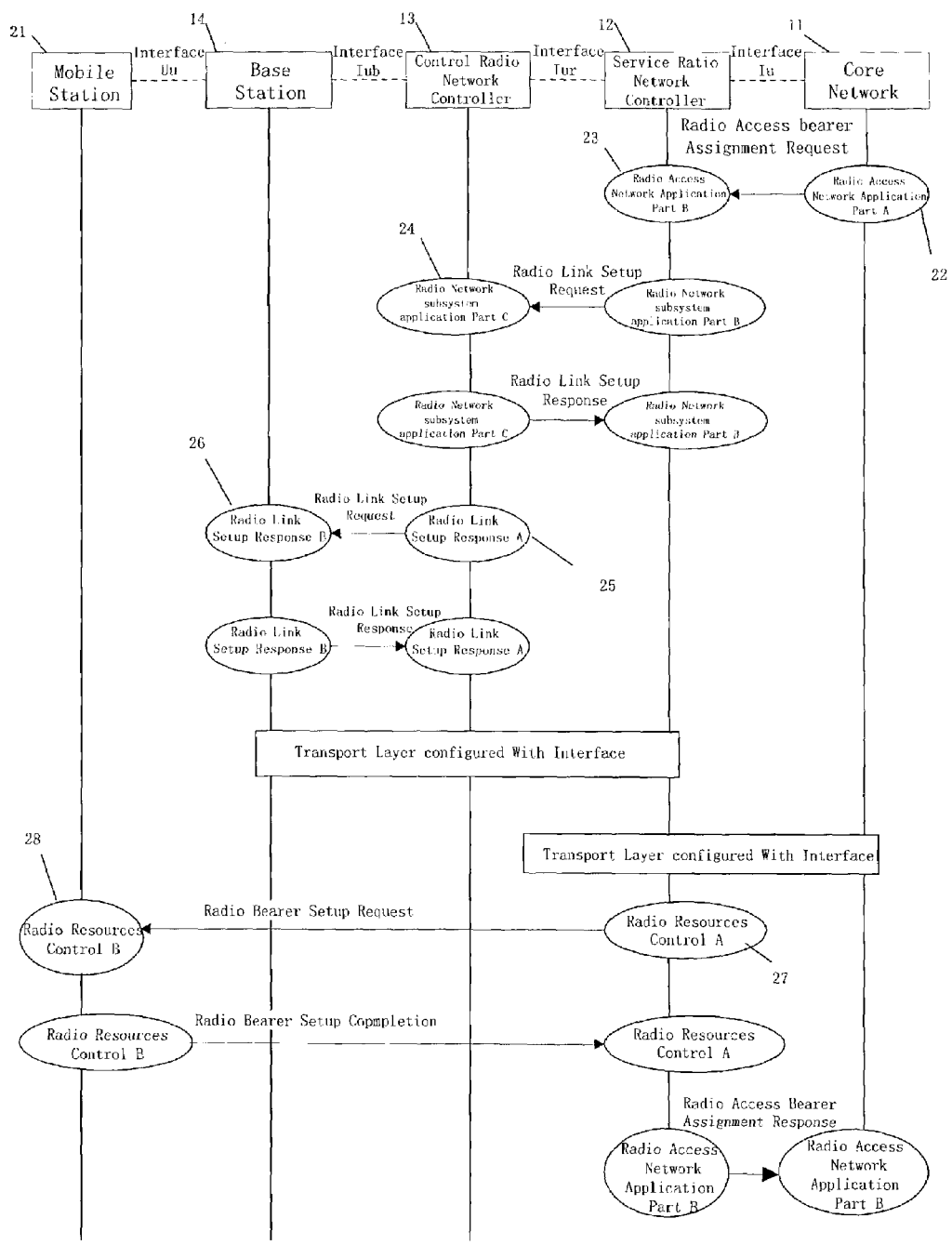
FIG. 2 is a flow chart of the associated signaling mapped by Qos of a Radio Bearer Service part in REL99.
Figure 3:
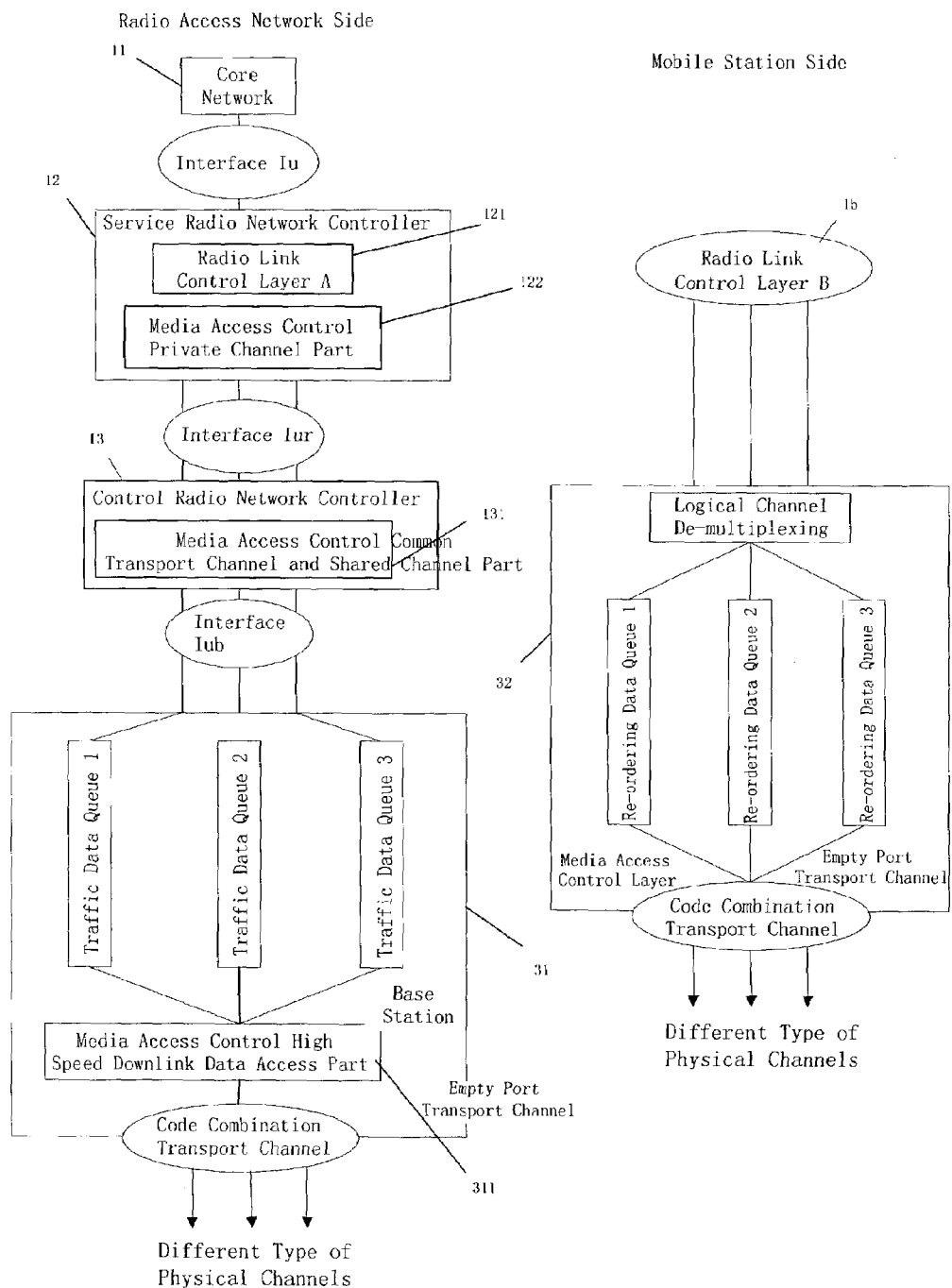
FIG. 3 is a structure of UTRAN side and UE side for supporting the traffics with different Qos in HSDPA in accordance with the principles of the present invention.
Figure 4:
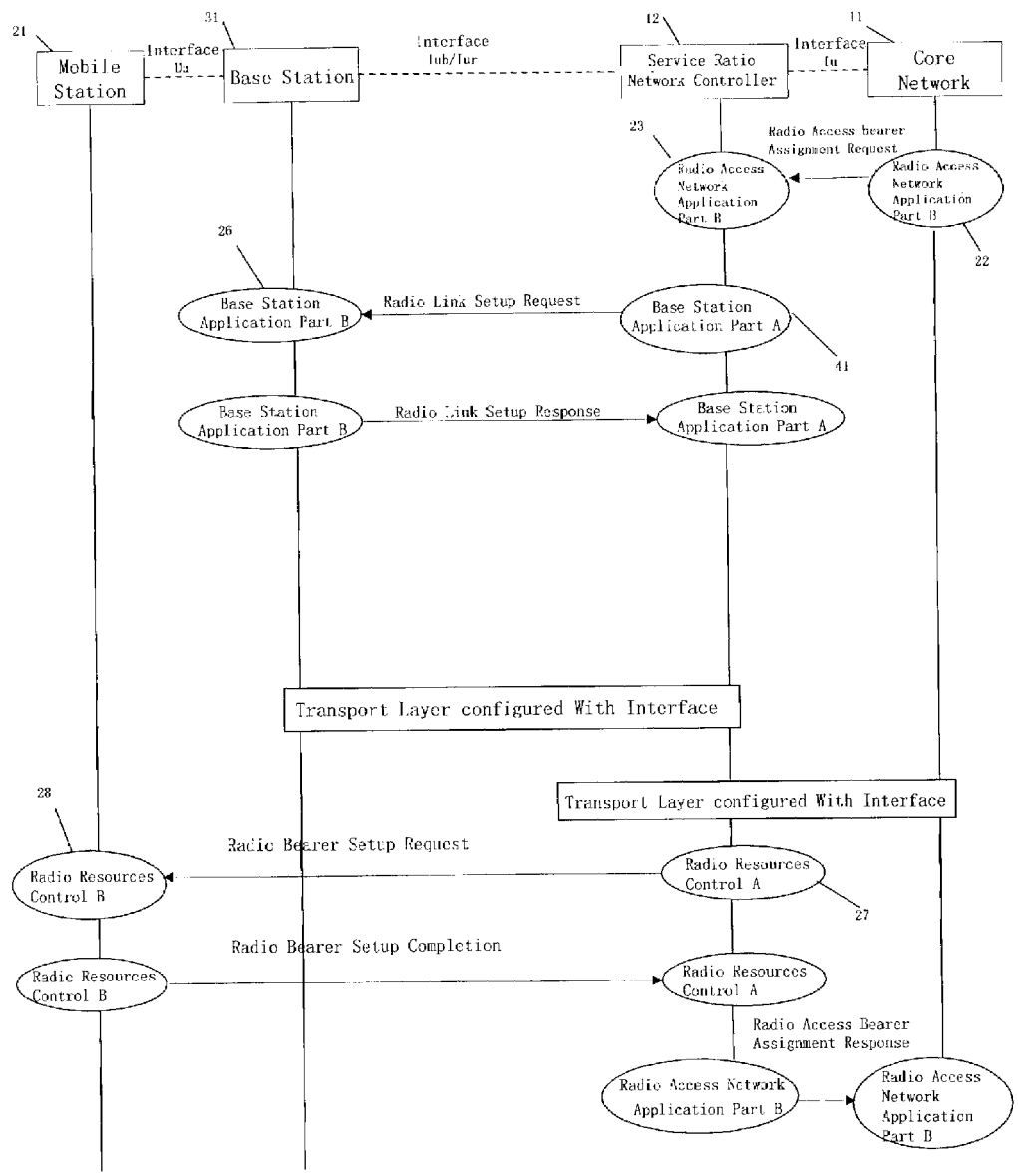
FIG. 4 is a flow chart of the associated signaling mapped by Qos of a Radio Bearer Service part in HSDPA in accordance with the principles of the present invention.

A method for supporting the traffics with different Qos by High Speed Downlink Packet Access System is shown in FIGS. 3 and 4, the supporting method comprises the steps of:

Step a, when the traffics with the attribute requirements of three kinds of different Qos require services at Core Network (CN) 11 side of the High Speed Downlink Packet Access System, the attributes of Qos is set by Core Network (CN) 11 based on the contracts and characteristics of three kinds of services, and a Radio Access Bearer Assignment Request is transmitted via Radio Access Network Application Part A (RANAP) 22 of Core Network (CN) 11 to transfer the set attribute values of Qos to the Radio Access Network Application Part B (RANAP) 23 of the Service Radio Network Controller (SRNC) 12;

Step b, the attributes of Qos of the traffics are mapped onto the parameters that are operable by the Radio Link Control layer A 121, the High Speed Media Access Control layer 311, and the physical layer by the Service Radio Network Controller (SRNC) 12. The parameters that are operable by the Radio Link Control layer A 121 are the mapped parameters of Qos of the logical channels; the parameters that are operable by the High Speed Media Access Control layer 311 are the mapped parameters of Qos of the transport channels; and the parameters that are operable by the physical layer are the mapped parameters of Qos of the physical channels.

Step c, the parameters of the logical channel part that can be set in Radio Link Control layer A 121 are set by the layer A 121 of the Service Radio Network Controller (SRNC) 12, and the setup of the channels and the associated set parameters are informed to the Mobile Station by transmitting the Radio Bearer Service Setup signaling by the Radio Resource Control A 27 of the Radio Link Control Layer A 121 to the Radio Resource Control B 28 of the Mobile Station 21;

Step d, the parameters of the transport channel part and the physical channel parameters that can not be set by the Radio Link Control layer are transferred by the Service Radio Network Controller (SRNC) 12 to the High Speed Media Access Control layer 311 and the physical layer at the Base Station 31 side through the Radio Link Setup Request signaling, allowing the High Speed Media Access Control layer 311 and the physical layer at the Base Station 31 side to set the parameters that can be set in their own layers; and the Radio Link Setup Request signaling is transmitted by the Base Station Application part A 41 of the Service Radio Network Controller (SRNC) 12 to the Base Station Application part B 12 of the Base Station 14;

Step e, the data queues corresponding to the different transport channels on the Interface Iub/Iur for storing the attributes of the different Qos for the different Mobile Stations are setup by the High Speed Media Access Control layer 311 at the Base Station 31 side based on the received parameters of transport channel part. The attribute requirements of the transport channel are thus the attribute requirements of the queues;

Step f, a controlled parameter table of the queue operation in the scheduling method is set by the High Speed Media Access Control layer 311 at the Base Station 31 side based on the queue attributes. The queue scheduling method performs the data scheduling based on the controlled parameter table to ensure the attribute requirements of Qos of the transport channels.

In step a, the attribute values set by Core Network (CN) 11 comprise alternative RAN parameter variables, the alternative maximum bit rate information, and the alternative maximum bit rate, and the like. Refer to Table 2 in the chapter of Background Art.

The mapped parameters of Qos of the logical channels comprise the Priority of the logical channels and RLC Parameters. RLC parameters comprise RLC mode, RLC mode being divided into an acknowledgement mode and an unacknowledgement mode; the size of RLC window; a mechanism for discarding the RLC packets; size of RLC PDU; and the mechanism parameters of PLC ACK and POLLING;

The mapped parameters of Qos of the transport channels comprise the Priority of the transport channels, the number of transport channels, and the transport channel attributes; the transport channel attributes comprise the maximum bit rate of the transport channel attributes, a residual bit error code ratio of the transport channel data, a guaranteed bit rate of the transport channel data, and a delay requirement of the transport channel data;

The mapped parameters of Qos of the physical channels comprise the type of the physical channel and the number of the channel codes. The type of the physical channel is fixed as a high speed downlink shared channel for the high speed data traffics. An initial value can be set for the number of the channel codes, however, the scheduling of the Media Access Control layer will be changed at each transmission time.

In step d, the parameters of Qos transferred by the request signaling which is setup by the Radio Link of the Service Radio Network Controller (SRNC) 12 comprise: the information of downlink shared channels, how many HS-DSCH are setup, how many information structures are available; the flags of the High Speed Downlink shared channels; the statistic descriptor of the transport channel sources, the attributes of the transport channels, the priority of the resources assignment and retention; the indicator of priority scheduling; block error rate; a window start point expected by the downlink data to receive; a window end point expected by the downlink data to receive; and the transport channel attributes comprise the maximum bit rate of the transport channel attributes, a residual bit error rate of the transport channel data, a guaranteed bit rate of the transport channel data, and a delay requirement of the transport channel data.

In step c, the Transport Format Sets of the parameters, which are associated with Qos and transferred by the Radio Bearer Service Request signaling, are deleted completely, the settings of the other parameters of Qos are the same as that in the method for supporting the traffics with different Qos by the REL99 system, comprising the Radio Bearer Information Domain; the signaling setup by RB; the associated information set by RLC; the mode of RLC, including an acknowledgement mode and a unacknowledgement mode, and not including transmittance mode; if it is the acknowledgement mode, the following domain will be set: discarding the transmission RLC, mainly, the different processing mode for discarding RLC PDU will be selected, for example, it will be based on whether the timer has an explicit signaling or not, the maximum re-transferring rate, and the like; indicating whether it is divided into segments or not; the mapped information of the Radio Bearer, and the like. Refer to Table 6 for the substantial parameters.

In step e, the queue attributes of the queue 1 are:

The maximum bit rate of the transport channel data<$a11$;

The residual bit error code ratio of the transport channel data<$a21$;

The guaranteed bit rate of the transport channel data<$a31$;

The delay requirement of the transport channel data<$a41$;

Then, the following controlled parameters can be set and the value assignment is performed:

The maximum re-transferring times of the data blocks=3;

The possible delay of the re-transferred data (number of TTI)=3;

The valid life time period of the data in the queue=4;

The Priority of scheduling the queuing data=1;

The number of the physical code channels will be determined when scheduling the data;

The queue attributes of the queue 2 are:

The maximum bit rate of the transport channel data<$a12$;

The residual bit error code ratio of the transport channel data<a22;
The guaranteed bit rate of the transport channel data<a32;
The delay requirement of the transport channel data<a42;
Then, the following controlled parameters can be set and the value assignment is performed:
The maximum re-transferring times of the data blocks=3;
The possible delay of the re-transferred data (number of TTI)=4;
The valid life time period of the data in the queue=5;
The Priority of scheduling the queuing data=2;
The number of the physical code channel will be determined when scheduling the data;
The queue attributes of the queue 3 are:
The maximum bit rate of the transport channel data<a13;
The residual bit error code ratio of the transport channel data<a23;
The guaranteed bit rate of the transport channel data<a33;
The delay requirement of the transport channel data<a43;
Then, the following controlled parameters can be set and the value assignment is performed:
The maximum re-transferring times of the data blocks=3;
The possible delay of the re-transferred data (number of TTI)=3;
The valid life time period of the data in the queue=5;
The Priority of scheduling the queuing data=3;
The number of the physical code channel will be determined when scheduling the data.

It is necessary to add and maintain the parameter table in the High Speed Media Access Control layer, the table corresponds to the queue one by one;

When the data of the number of the physical channel codes are scheduled, it is determined based on the modulation and encoding method and the amount of the data to be transmitted, so it is at a dynamic state;

The parameters apart from the number of the physical channel codes are determined by the High Speed Media Access Control layer (MAC-hs) 311, which has been implemented at the Base Station 31 side (NODE B) since the queues are setup, and can be reset, therefore it is at a semi static state.

Figure 5:
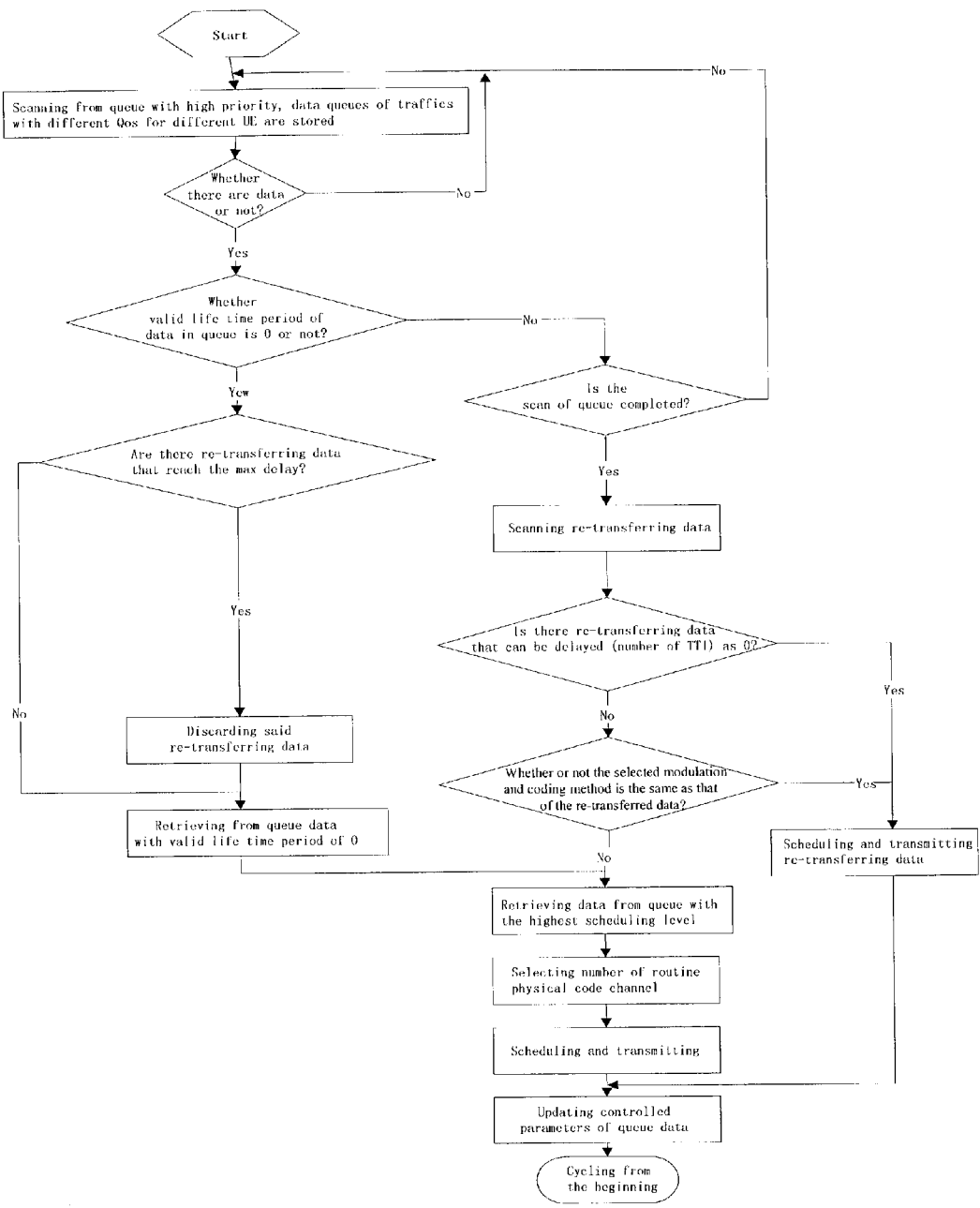
FIG. 5 is a flow chart of a scheduling method of a Media Access Control layer in HSDPA in accordance with the principles of the present invention.

As shown in FIG. 5, in step f, the data scheduling steps performed by the queue scheduling method based on the controlled parameter tables are described as follows:

Data scheduling step 1:
Scanning the queues for the first time, if there is no data with the valid life time period=0 in the queue, then new data will be retrieved from Queue 1 to select the physical channel codes for transmitting; if the transmitting is unsuccessful, then the modulation and encoding method is 1. Updating the controlled parameters of the queues as follows:
Queue 1 data: The valid life time period of data in the queue=4, and one re-transferred data, the delay of the re-transferred data (number of TTI)=3;
Queue 2 data: The valid life time period of data in the queue=4, the Transmission Time Interval (TTI) will be decreased by 1;
Queue 3 data: The valid life time period of data in the queue=4, the Transmission Time Interval (TTI) will be decreased by 1;

Data scheduling step 2:
Scanning the queues for the second time, if there is no data with the valid life time period=0 in the queue, then the re-transferred data will be scanned, because the delay of re-transferred data (number of TTI)=3, and the type of the modulation and encoding method is 2 at the time, so the re-transferred data is not transmitted, and data will be retrieved from Queue 1 to select the physical channel codes for transmitting, and the transmitting is successful. Updating the controlled parameters of the queues as follows:
Queue 1 data: The valid life time period of data in the queue=4, and one re-transferred data, the delay of the re-transferred data (number of TTI)=2, the Transmission Time Interval (TTI) is decreased by 1;
Queue 2 data: The valid life time period of data in the queue=3, the Transmission Time Interval (TTI) is decreased by 1;
Queue 3 data: The valid life time period of data in the queue=3, the Transmission Time Interval (TTI) will be decreased by 1;

Data scheduling step 3:
Scanning the queues for the third time, if there is no data with the valid life time period=0 in the queue, then the re-transferred data will be scanned, because the delay of re-transferred data (number of TTI)=2, and the type of the modulation and encoding method is 1 at the time, so the re-transferred data is transmitted, the transmitting is unsuccessful. Updating the controlled parameters of the queues as follows:
Queue 1 data: The valid life time period of data in the queue=3, the Transmission Time Interval (TTI) is decreased by 1. There is one re-transferred data, the delay of the re-transferred data (number of TTI)=1, the Transmission Time Interval (TTI) is decreased by 1;
Queue 2 data: The valid life time period of data in the queue=2, the Transmission Time Interval (TTI) is decreased by 1;
Queue 3 data: The valid life time period of data in the queue=2, the Transmission Time Interval (TTI) will be decreased by 1;

Data scheduling step 4:
Scanning the queues for the fourth time, if there is no data with the valid life time period=0 in the queue, and the type of the modulation and encoding method is 2 at the time, then the re-transferred data will not be transmitted, and data will be retrieved from Queue 2 to select the physical channel codes for transmitting, and the transmitting is successful. Updating the controlled parameters of the queues as follows:
Queue 1 data: The valid life time period of data in the queue=2, the Transmission Time Interval (TTI) is decreased by 1. There is one re-transferred data, the delay of the re-transferred data (number of TTI)=0, the Transmission Time Interval (TTI) is decreased by 1;
Queue 2 data: The valid life time period of data in the queue=5;
Queue 3 data: The valid life time period of data in the queue=1, the Transmission Time Interval (TTI) will be decreased by 1;

Data scheduling step 5:
Scanning the queues for the fifth time, if there is no data with the valid life time period=0 in the queue, then the re-transferred data will be scanned, because the delay of the re-transferred data (number of TTI)=0, and the type of the modulation and encoding method is 2 at the time, even though the modulation and encoding method is not matched, the re-transferred data will be transmitted, and the transmitting is successful. Updating the controlled parameters of the queues as follows:
Queue 1 data: The valid life time period of data in the queue=1, the Transmission Time Interval (TTI) is decreased by 1.
Queue 2 data: The valid life time period of data in the queue=5;

Queue 3 data: The valid life time period of data in the queue=0, the Transmission Time Interval (TTI) will be decreased by 1;

Data scheduling step 6:

Scanning the queues for the sixth time, the valid life time period of the data in the queue=1, and the data will be retrieved from queue to select a suitable number of the physical code channels, and the transmitting is successful. Updating the controlled parameters of the queues as follows:

Queue 1 data: The valid life time period of data in the queue=0, the Transmission Time Interval (TTI) is decreased by 1.

Queue 2 data: The valid life time period of data in the queue=4, the Transmission Time Interval (TTI) is decreased by 1;

Queue 3 data: The valid life time period of data in the queue=5;

The data scheduling is ended.

In the method, the priority of the re-transferred data scheduling=the priority of the original queue+the delay of the re-transferred data (number of TTI), the smaller the data, the higher the priority for scheduling will be;

The scheduling priority of the queue data that do not have a valid life time period of 0=the valid life time period+queue priority+whether it has been scheduled or not, the smaller the data, the higher the priority for scheduling will be;

When new data are being transmitted, the number of the physical channels may be selected based on the amount of data, and the modulation and encoding method selected currently by the adaptive modulation and encoding function (AMC).

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A method for supporting traffics with different Qos by a High Speed Downlink Packet Access System, wherein, the method for supporting comprising the steps of:

step a, setting attributes of Qos by a Core Network based on contracts and characteristics of several services, when the traffics with several different attribute requirements of Qos require to be serviced at the Core Network side of the High Speed Downlink Packet Access System, and transferring values of the attributes of Qos to a Radio Access Network Application Part of a Service Radio Network Controller via a Radio Access Bearer Service Assignment Request;

step b, mapping the attributes of Qos of the traffics onto parameters that are operable by a Radio Link Control layer, a High Speed Media Access Control layer, and a physical layer by the Service Radio Network Controller, wherein the parameters that are operable by the Radio Link Control layer are the mapped parameters of Qos of logical channels, the parameters that are operable by the High Speed Media Access Control layer are the mapped parameters of Qos of transport channels, and the parameters that are operable by the physical layer are the mapped parameters of Qos of physical channels;

step c, setting the parameters of the logical channels that can be set in its own layer by the Radio Link Control layer of the Service Radio Network Controller, wherein the setting of the channels and the setting of the associated parameters are informed to a Mobile Station via a Radio Bearer Service Setup signaling;

step d, transferring the parameters of the transport channels and the mapped parameters of the physical channel that can not be set by the Radio Link Control layer, by the Service Radio Network Controller to the High Speed Media Access Control layer and physical layer at the Base Station via a Radio Link Setup Request signaling, allowing the High Speed Media Access Control layer and the physical layer to set the parameters that can be set in their own layers;

step e, setting up data queues corresponding to different transport channels on an Interface Iub/Iur for storing different attributes of Qos for different Mobile Stations by the High Speed Media Access Control layer at the Base Station based on the received parameters of the transport channels, attribute requirements of the transport channels are thus the attribute requirements of the data queues;

step f, setting a controlled parameter table of a queue operation in a scheduling method by the High Speed Media Access Control layer at the Base Station based on the attribute requirements of the data queues wherein, a queue scheduling method performs a data scheduling based on the controlled parameter table to ensure the attribute requirements of Qos of the transport channels.

2. The method for supporting according to claim 1, further comprising: mapping the traffics with different Qos onto different logical channels by the Radio Link Control layer of the Service Radio Network Controller; and mapping the different logical channels onto the different transport channels by the Media Access Control layer of the Control Radio Network Controller of the High Speed Downlink Packet Access System.

3. The method for supporting according to claim 1, wherein in step b, the mapped parameters of Qos of the logical channels comprise a priority of the logical channels and the parameters of the Radio Link Control layer; the mapped parameters of Qos of the transport channels comprise a priority of the transport channels, the number of the transport channels and attributes of the transport channels; and the mapped parameters of Qos of the physical channels comprise a type of the physical channels and the number of the channel codes.

4. The method for supporting according to claim 3, wherein the parameters of the Radio Link Control layer comprise a mode of the Radio Link Control layer, the mode of the Radio Link Control layer is divided into an acknowledgement mode and an unacknowledgement mode; a window size of the Radio Link Control layer; a mechanism for discarding a packets of the Radio Link Control layer; a size of RLC PDU and mechanism parameters of PLC ACK and POLLING;

the transport channel attributes which comprise a maximum bit rate of the attributes of the transport channels, a residual bit error code ratio of transport channel data, a guaranteed bit rate of the transport channel data, and a delay requirement of the transport channel data;

the type of the physical channels is fixed as a High Speed Downlink shared channel for high speed data traffics; an initial value can be set for the number of channel codes, however, scheduling of the High Speed Media Access Control layer is changed at each transmission time.

5. The method for supporting according to claim 1, wherein, in step d, in the parameters of the transport channels transferred by the Radio Link Setup request signaling of the Service Radio Network Controller, a Transport Format Set transferred by the same signaling as that of a mobile communication system broadband code division multiple access REL99 system is substituted by the transport channel attributes; the transport channel attributes comprise a maximum bit rate of the attributes of the transport channel, a residual bit error code ratio of transport channel data, a guaranteed bit rate of the transport channel data, and a delay requirement of the transport channel data; the settings of the other parameters are the same as that of the method for supporting the traffics with different Qos by the third generation of the mobile communication system broadband code division multiple access REL99 system.

6. The method for supporting according to claim 1, wherein, in step c, Transport Format Sets of the parameters associated with Qos transferred are deleted completely by a Radio Bearer Service Request signaling, the setting of the other parameters of Qos is the same as the setting of the parameters for the traffics with different Qos in the third generation of mobile communication system broadband code division multiple access REL99 system.

7. The method for supporting according to claim 1, wherein, in step e, the attributes of data queue 1 are:
a maximum bit rate of a transport channel data<$a1n$;
a residual bit error code ratio of the transport channel data<$a2n$;
a guaranteed bit rate of the transport channel data<$a3n$;
a delay requirement of the transport channel data<$a4n$;
wherein, controlled parameters can be set and values can be assigned to the controlled parameters which include:
a maximum re-transferring times of data blocks=$b1n$;
a possible delay of re-transferred data (number of TTI) =$b2n$;
a valid life time period of data in the data queue 1=$b3n$;
a priority of scheduling queuing of data queue 1=$b4n$;
a number of channel code=$b5n$;
wherein, n=0, 1, 2 . . . of positive integer number.

8. The method for supporting according to claim 1, wherein, in step f, a data scheduling method carried out by the queue scheduling method based on the controlled parameters comprises the following steps:
step aa, beginning data scheduling after the data queues being setup and the attributes of the data queues being set by the High Speed Media Access Control layer;
step bb, scanning the data queues of the traffics with different Qos of the different Mobile Stations by the High Speed Media Access Control layer from a higher priority of the data queues;
step cc, determining whether there are data in the data queues or not; if there are, then proceeding to step dd; if there are not, then scanning the next data queue by the High Speed Media Access Control layer, and returning to step bb;

step dd, determining whether a valid life time period of the data in the data queue is 0 or not by the High Speed Media Access Control layer; if the valid life time period is 0, then proceeding to step hh; if the valid life time period is not 0, then proceeding to step ff;
step ee, determining whether the data queue has been scanned completely or not by the High Speed Media Access Control layer; if the data queue has not been scanned completely, then returning to step bb; if the data queue has been scanned completely, then proceeding to step ee;
step ff, scanning re-transferred data by the High Speed Media Access Control layer to determine whether there is re-transferred data with a delay of 0 or not, or whether the number of a Transmission Time Interval is 0 or not, if the number is 0, proceeding to step hh, if the number is not 0, proceeding to step gg;
step gg, determining whether a selected modulation and coding method is the same as that of the re-transferred data or not by the High Speed Media Access Control layer; if the selected modulation and coding method is the same as the re-transferred data, proceeding to step hh, if the selected modulation and coding method is not the same as the re-transferred data, retrieving the data by the High Speed Media Access Control layer from the data queue with a highest scheduling level, and proceeding to step kk;
step hh, scheduling and transmitting the re-transferred data by the High Speed Media Access Control layer, and proceeding to step ll;
step ii, determining whether there are re-transferred data that reach a maximum delay or not by the High Speed Media Access Control layer, if there are re-transferred data that reach the maximum delay, then discarding the re-transferred data first, then proceeding to step jj; if there are no re-transferred data that reach the maximum delay, then proceeding directly to step jj;
step jj, retrieving the data with the valid life time period of 0 in the data queues by the High Speed Media Access Control layer;
step kk, selecting a suitable number of channel codes by the High Speed Media Access Control layer based on the number of data blocks and the selected modulation and coding method for scheduling and transmitting the data;
step ll, updating controlled data of the data queues by the High Speed Media Access Control layer, and returning to step aa.

9. The method for supporting according to claim 1, further comprising the step of providing a Downlink Shared Transport channel (HS-DSCH) with only one empty port which exists between each Mobile Station (UE) and Base Station, wherein a plurality of transport channels can be set up by Interface Iur/Iub.

* * * * *